United States Patent
Slikkerveer et al.

(10) Patent No.: US 8,608,081 B2
(45) Date of Patent: Dec. 17, 2013

(54) CHIP CARD COMPRISING A DISPLAY

(75) Inventors: Peter Slikkerveer, Waalre (NL); Pawel Musial, Gdynia (PL)

(73) Assignee: NXP B.V., Eindhoven (NL)

( * ) Notice: Subject to any disclaimer, the term of this patent is extended or adjusted under 35 U.S.C. 154(b) by 268 days.

(21) Appl. No.: 12/742,118

(22) PCT Filed: Nov. 10, 2008

(86) PCT No.: PCT/IB2008/054694
§ 371 (c)(1),
(2), (4) Date: May 10, 2010

(87) PCT Pub. No.: WO2009/063385
PCT Pub. Date: May 22, 2009

(65) Prior Publication Data
US 2010/0252638 A1 Oct. 7, 2010

(30) Foreign Application Priority Data
Nov. 12, 2007 (EP) .................................... 07120456

(51) Int. Cl.
*G06K 7/00* (2006.01)

(52) U.S. Cl.
USPC .......................................... 235/492; 235/487

(58) Field of Classification Search
USPC .......................................... 235/380, 487, 492
See application file for complete search history.

(56) References Cited

U.S. PATENT DOCUMENTS

| | | | | |
|---|---|---|---|---|
| 3,961,840 A | * | 6/1976 | Morokawa et al. | 345/50 |
| 5,814,972 A | * | 9/1998 | Shimada et al. | 320/132 |
| 5,950,013 A | * | 9/1999 | Yoshimura et al. | 710/5 |
| 7,156,313 B2 | | 1/2007 | Ou et al. | |
| 2003/0019942 A1 | * | 1/2003 | Blossom | 235/492 |
| 2005/0247777 A1 | * | 11/2005 | Pitroda | 235/380 |
| 2006/0049263 A1 | * | 3/2006 | Ou et al. | 235/492 |
| 2006/0190737 A1 | | 8/2006 | Miyasaka | |
| 2010/0276496 A1 | * | 11/2010 | Slikkerveer et al. | 235/492 |
| 2011/0101108 A1 | * | 5/2011 | Slikkerveer et al. | 235/492 |

FOREIGN PATENT DOCUMENTS

| | | |
|---|---|---|
| DE | 19910768 A1 | 9/2000 |
| EP | 1280099 A | 1/2003 |
| WO | 9420929 A1 | 9/1994 |

OTHER PUBLICATIONS

U.S. Appl. No. 60/735,893, filed Nov. 14, 2005, Terliuc et al.*
Rankl, Wolfgang, et al; "Handbuch Der Chipkarten, Elektrische Eigenschaften"; Handbuch Der Chipkarten: Aufbau-Funktionsweise—Einsatz Von Smart Cards, Hanser Verlag, DE; pp. 52-63; (Aug. 29, 2002).

* cited by examiner

Primary Examiner — Michael G Lee
Assistant Examiner — Matthew Mikels

(57) ABSTRACT

A chip card (1) comprises a chip card controller (3), access to at least one power source (7, 8, 10), a display (6), and a display driver (5) operatively coupled to the chip card controller (3), to the display (6), and to the at least one power source (7, 8, 10). The display driver (5) is configured to drive the display (6) and the display driver (5) comprises, as an integral part, a power management functionality (11) configured to manage power that comes from the at least one power source (7, 8, 10) for at least the display driver (5).

9 Claims, 3 Drawing Sheets

CHIP CARD COMPRISING A DISPLAY

FIELD OF THE INVENTION

The invention relates to a chip card comprising a display.

BACKGROUND OF THE INVENTION

In this context, a chip card is any pocket-sized card with an embedded integrated circuit that comprises hardware logic, a memory or a microcontroller/microprocessor which can process information. Chip cards can be categorized in accordance with different criteria. Particularly, chip cards can be categorized as memory-chip cards that comprise a relatively simple logic and as processor-chip cards that comprise, for instance, an operation system. Particularly processor-chip cards can receive an input signal which is processed, by way of an integrated circuit application, and deliver an output signal. Generally, chip cards can be contactless or contact chip cards, or can be a combination of both.

Contact chip cards may include a contact module on their fronts. This contact module may be gold plated and has a size of approximately 1 cm by 1 cm and may contain a chip at the back. The contact chip card may communicate with a reader. When inserted into the reader, electrical connectors of the reader contact the contact module for reading information from and writing information back to the chip card. Since normally the chip card does not include a battery, energy is supplied to the contact chip card by the reader. Contact chip cards are, for instance, standardized by ISO/IEC 7816 or ISO/IEC 7810.

In a contactless chip card, the integrated circuit communicates with the reader in a contactless manner, for instance through Radio-frequency identification (RFID). Contactless chip cards are, for instance, standardized by ISO/IEC 14443 or ISO 15693. Contactless chip cards are also known as transponders which may or may not include an active energy source, such as a battery. Transponders not having a battery are also known as passive transponders and transponders comprising a battery are known as active transponders.

International application for patent No. 94/20929 discloses a chip card that comprises an electronic data memory, an interface means connected to the data memory, to allow access to a reader, and a data display operable to display information indicative of the contents of the data memory.

Chip cards may be used, inter alia, as banking cards, transportation ticketing, loyalty cards, or e-passports. Because of this, a relatively high security level against fraudulent tampering of the card must be assured. Even though the data display may be meant to decrease danger of fraud and tampering of the usage of the chip card, the data display as an additional component potentially allows additional methods for fraud and tampering. Additionally, the display potentially increases power consumption.

OBJECT AND SUMMARY OF THE INVENTION

It is an object of the present invention to provide a chip card comprising a display, which potentially uses less electric energy and whose security level against fraudulent misuse is increased.

The object is achieved in accordance with the invention by means of a chip card comprising a chip card controller, access to at least one electric power source, a display, and a display driver operatively coupled to the chip card controller, to the display, and to the at least one power source, wherein the display driver is configured to drive the display and comprises, as an integral part, a power management functionality configured to manage electric power that is available from the at least one power source for at least the display driver.

The inventive chip card comprises the display that may, for instance, be an electrophoretic display, an electrochrome display, or a liquid crystal based display. In order to drive the display, the chip card needs the display driver. A display driver may be a demultiplexer at the direct contact of the display. A display driver may also or alternatively determine which voltage should be where on the display. This functionality may also be referred to as display controller. Furthermore, the inventive chip card includes power management capability particularly intended to reduce power consumption of the chip card. According to the invention, the power management functionality is an integral part of the display driver. This may particularly be achieved by forming the display driver as a single integrated circuit which includes the power management functionality.

The power management functionality is configured to manage at least the electric power for the display driver, i.e. the display driver is configured to perform its own power management. In one embodiment of the inventive chip card, the power management functionality is also responsible to carry out the power management for the chip card controller. This potentially reduces further electric power consumption of the inventive chip card.

The power management functionality may particularly be configured to turn off power for the chip card controller while the display driver writes information to the display and/or the display displays display information. Then, the chip card controller, which may be, for instance, a microprocessor or a microcontroller, is only powered when absolutely necessary.

The inventive chip card may particularly be configured to communicate with an external reader utilizing its chip card controller. Then, the inventive chip card comprises at least one appropriate communication interface. The inventive chip card may communicate with the reader contactlessly or in a contactbound manner, and thus may include a contactless communication interface or a contact interface. The contact communication interface may be in accordance with ISO 7816 and the contactless communication interface may comprise an antenna and may be in accordance with ISO 14443. It is also possible that the inventive chip card comprises both, a contact communication interface and a contactless communication interface.

When communicating with the reader, the inventive chip card may be powered via the appropriate communication interface. Thus, the power source of the inventive chip card may be formed by a communication interface. The power source, however, may also be a battery which may be non-chargeable or be chargeable utilizing, for instance, power from the communication interface. A further useful power source for the chip card is a capacitor or a solar cell.

If the inventive chip card comprises access to at least two different power sources, then the power management functionality may be configured to select one of the power sources in accordance with availability of the power sources and/or in accordance with pre-defined criteria. For instance, the power management functionality may be configured to select, if the chip card is activated, only the battery as the power source for the chip card if no power is available via the communication interface. It is also possible to switch from the battery as the power source for the chip card to the communication interface as the power source for the chip card if power becomes available via the communication interface. This enhances the lifetime of the battery.

If the inventive chip card comprises the contact communication interface, then the power management functionality of the display driver may be configured to select the contact communication interface as the preferred power source for the chip card. When including the contact communication interface, then power is delivered to the chip card from the reader in a contactbound manner. This results in a relative strong power source potentially enhancing reliable power delivery to the inventive chip card.

The power management functionality is integrated into the display driver which may be formed as a single integrated circuit. In one embodiment of the inventive chip card, this integrated circuit includes the power management functionality, but not the chip card controller. This embodiment results in a relatively high level of integration of the inventive chip card, potentially decreasing production cost. On the other hand, the separation of the chip card controller and the display driver potentially increases the level of security. A full integration of most or all components, especially an integration of the chip card controller and the display driver including the power management functionality into a single integrated circuit results in an increased number of outputs, potentially alleviating eavesdropping of the entire chip card. Additionally, since according to this embodiment, the chip card controller and the display driver are not integrated into a single integrated circuit, the power management functionality can relatively easily shut off the chip card controller while still activating the display driver. This results in a further improved power management, because updating the display by the display driver may take a relatively long time and support by the chip controller is not needed during this time.

In a further embodiment, the inventive chip card comprises a user input device and a user input interface operatively coupled to the user input device. The user input device may particularly be an integral part of the display driver and is configured to turn on and/or turn off at least parts of the chip card. The user input device may, for instance, be a button and the user input interface may be a button interface operatively coupled to the button and integrated into the display driver. The button, generally the user input device, is designed to turn on and/or turn off at least parts of the inventive chip card particularly independent on a communication with a reader. The button, generally the user input device, may particularly be used to turn on the chip card to display display information of the chip card. By activating the user input device, the user of the inventive chip card can turn on and off the chip card. This may allow the user to bring the chip card into a standby mode in which the chip card controller is shut off, reducing power consumption of the chip card. When needed, the chip card controller is reactivated to prolong the lifetime of the power source, particularly the battery.

The inventive chip card may also be configured to verify that the user input device has been activated while the chip card is already running. This may be achieved by a register of the chip card registering the activation of the user input device.

The button may be a push button which provides temporary action while being pushed, and not a continuous turn on action.

The inventive chip card may also include further components, such as a finger print sensor. The inventive chip card may also include an One Time Password (OTP) system which prevents so-called "card swiping", wherein information stored on a chip card memory is copied and the copied information is used for fraudulent misuse.

By activating the user input device, the user of the inventive chip card can turn on and off the chip card. This may allow the user to bring the chip card into a standby mode in which the chip card controller is shut off, reducing power consumption of the chip card. When needed, the chip card controller is reactivated to prolong the lifetime of the power source, particularly the battery.

The user input interface may be configured to generate a signal to wake up the power management functionality in response to activating the user input device, wherein the chip card is shut off before activating the user input device. The user input interface and the power management functionality may be formed on the same semi-conductor, such as silicon, the power management functionality may be configured to turn off the entire chip card, and the user input device may be configured to generate a signal of sufficient energy to wake up the power management functionality via the user input interface. This embodiment of the inventive chip card provides for further power savings. Since for this embodiment of the inventive chip card the power management functionality and the user input interface are on the same semi-conductor, such as silicon, a relatively low power standby function can be realized, wherein the power management functionality switches the entire chip card off, may be except of a wakeup function at the user input interface.

If the user input device is a button, particularly a push button, the user input interface is a button interface, then the button may be configured to provide, when activated, the signal sufficient to wake up the power management functionality via the button interface. This may be achieved if, for instance, the button is a push button providing a signal of sufficient energy to the button interface when activated or when the button comprises a piezo device providing an energy pulse to the button interface.

In another embodiment, the inventive chip card comprises a timing device configured to wake up at least parts of the chip card. Thus, the timing device is configured to wake up the entire chip card or only one or some of its components, such as its chip card controller or its display driver.

The timing device can be used for several purposes. The timing device may be configured to generate a signal at pre-defined time instances, periodically, or after a pre-defined time period after an internal action of the chip card, or at a certain time/date as it is possible with a real time clock. The signal is then used for waking up the desired parts of the chip card. Particularly, when the timing device is the real time clock, an alarm function of the real time clock could be used as a signal for waking up the chip card or at least parts of the chip card.

The signal generated by the timing device may, for instance, be used to periodically wake up the entire inventive chip card or parts thereof, particularly its chip card controller, or to wake up the chip card or parts thereof at pre-defined time instances. The timing device may also be used to wake up the chip card or parts thereof after a pre-defined time period after a certain action of the chip card. The timing device may particularly be used to initiate clearing and/or resetting the display after a pre-defined time period. Then, the part of the chip card to be woken up is the display. This may be achieved by waking up the chip controller which then can send a signal to the display driver to clear and/or reset the display. The timing device can also be configured to control directly the display driver to reset and/or clear the display. This embodiment of the inventive chip card is particularly advantageous if the display is a bistable display which continues displaying its content without a power source.

While the timing device is running, the power for the remaining parts of the chip card, besides the power management functionality or at least a wake-up circuit of the power management functionality, might be turned off.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

Figure 1:
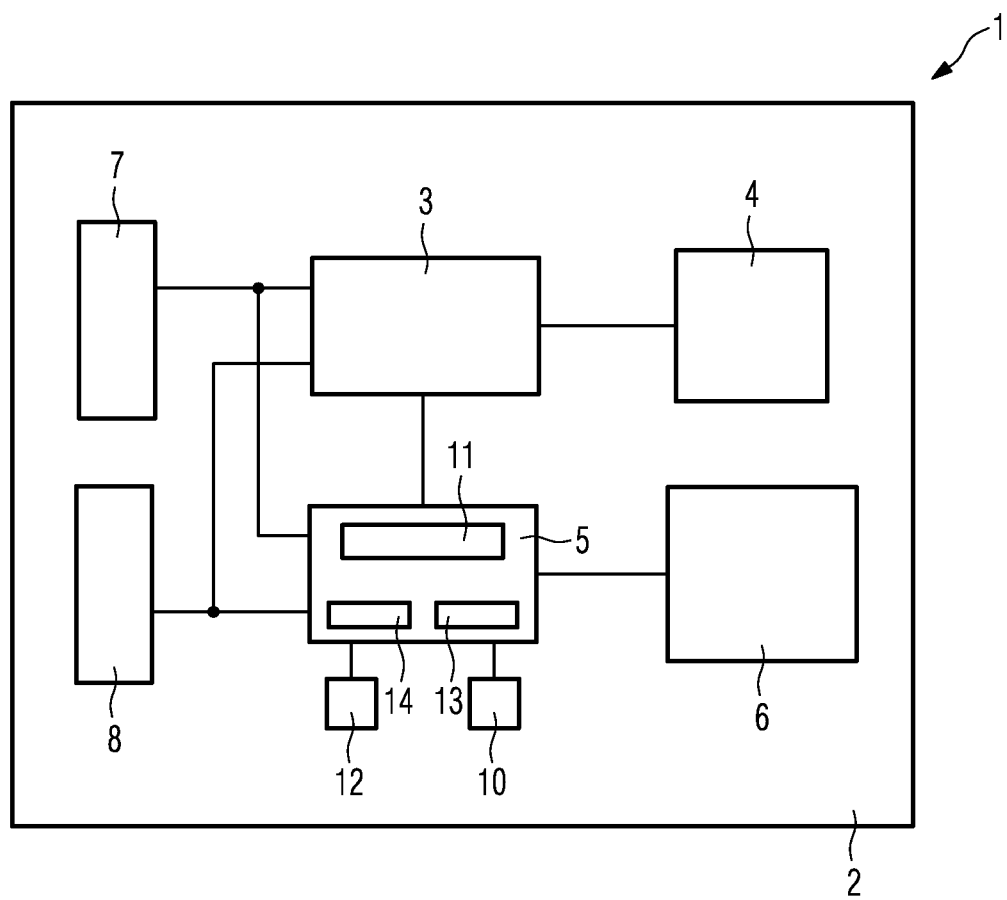
FIG. 1 is a chip card comprising a display.
Figure 1:
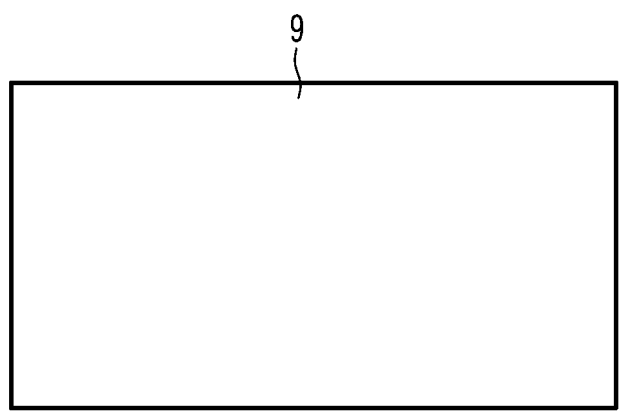

FIG. 1 shows a chip card 1 comprising a substrate 2, a microcontroller 3, a memory 4, a display driver 5, and a display 6 operatively coupled to the display driver 5. The display driver 5 and the memory 4 are operatively coupled to the microcontroller 3, and the microcontroller 3, the memory 4, the display driver 5, and the display 6 are embedded in the substrate 2. The memory 4 may be an EEPROM, the substrate 2 may be made from plastics, and the display 6 may be an electrophoretic display.

For the exemplary embodiment, the chip card 1 comprises a contact communication interface 7 and a contactless communication interface 8, each operatively coupled to the microcontroller 3 and to the display driver 5. The communication interfaces 7, 8 are embedded in the substrate 2. The contact communication interface 7 may be, for instance, in accordance with ISO 7816 and the contactless communication interface 8, which may comprise an antenna, may be, for instance, in accordance with ISO 14443. Utilizing its communication interfaces 7, 8, the chip card 1 can communicate with a reader 9 that comprises an appropriate communication interface not explicitly shown in the figures.

If the reader 9 comprises a contact communication interface, then the chip card 1 may be inserted into the reader 9 such that the contact communication interface of the reader 9 contacts the contact communication interface 7 of the chip card 1 in a manner per se known in the art. Then, communication between the reader 9 and the chip card 1 can be carried out via the contact communication interface 7. Furthermore, electric energy for the chip card 1 can also be supplied via the contact communication interface 7.

If the reader 9 comprises a contactless communication interface, then the reader 9 can communicate contactlessly with the chip card 1 utilizing the contactless communication interface 8. Communication may then be carried out utilizing Radio Frequency Identification (RFID) per se known in the art. The chip card 1 may then be powered utilizing the field emitted by the reader 9.

For the exemplary embodiment, the chip card 1 further comprises a battery 10 embedded in the substrate 2. The battery 10 is an example of an active power source and may be a chargeable or a non-chargeable battery. Therefore, the chip card 1 may be powered by the battery 10 or via the communication interfaces 7, 8.

For the exemplary embodiment, the display driver 5 is formed by a single integrated circuit that does not include the microprocessor 3, the memory 4, and the communication interfaces 7, 8. Furthermore, the chip card 1 comprises power management functionality integrated into the integrated circuit forming the display driver 5. The power management functionality is indicated by a power management unit 11 in FIG. 1. Besides the communication interfaces 7, 8, the battery 10 is operatively coupled to the display driver 5 such that its power management unit 11 can perform power management of the chip card 1 as will be explained below.

The display 6 is intended to display information stored, for instance, in the memory 4. The microcontroller 3 controls the display driver 5 such that it drives appropriately the display 6.

For the exemplary embodiment, the chip card 1 further comprises a button 12 embedded in the substrate 2. The button 12 is an example of an input device which can be used, when activated by a user of the chip card 1, to turn on the display 6 to show, for instance, the content of the memory 4. In order to be functional, the button 12 is operatively connected to a button interface 13. The button interface 13 is an example of an input interface for the input device and is an integral part of the display driver 5 by being integrated into the single integrated circuit forming the display driver 5.

When the user activates the button 12, then the button interface 13 generates a signal which wakes up the display driver 5. The display driver 5 then activates the microcontroller 3 which in turn retrieves information stored in the memory 4 to be displayed by the display 6.

For the exemplary embodiment, the chip card 1, i.e. its components can be powered by three different power sources, namely the battery 10, or via the communication interfaces 7, 8 when communicating with the reader 9. The purpose of the power management unit 11 is, inter alia, to choose the appropriate power source.

If the reader 9 is a contact reader, then the chip card 1 may be inserted into the reader 9 such that the contact communication interfaces 7 of the reader 9 and the chip card 1 make contact. Then, not only communication between the reader 9 and the chip card 1 is carried out via the contact communication interface 7, but also electric power is delivered via the contact communication interface 7 to the chip card 1. If operated in this mode, the system, i.e. the display driver 5 including its power management unit 11 and the microcontroller 3 wake up upon receiving detecting an electric supply voltage at the contact communication interface 7. For the exemplary embodiment, the electric power is fed directly from the contact communication interface 7 to the microcontroller 3 and to the display driver 5.

If the reader 9 is a contactless reader, then the chip card 1 communicates with the reader 9 via its contactless communication interface 8 when the chip card 1 is in the vicinity of the reader 9. The reader 9 emits a field which powers the chip card 1. For the exemplary embodiment, the electric power is fed directly from the contactless interface 8 to the microcontroller 3 and to the display driver 5 including its power management unit 11.

The chip card 1 further comprises a real-time clock 14 which is an integral part of the display driver 5 by being integrated into the single integrated circuit forming the display driver 5. The real-time clock 14 may be programmed to generate and send a signal at pre-defined time instances, periodically, or after a pre-defined period of time the display 6 has displayed some display information. The signal generated by the real-time clock 14 may be used to wake-up the microcontroller 3 and/or the display driver 5, to display some display information on the display 6, or to clear the display 6 after the pre-defined time period.

For the exemplary embodiment it is possible that even though the chip card 1 is not in contact with the reader 9 the display 6 is turned on by the real-time clock 14. For the exemplary embodiment, the power management unit 11 then wakes up the display driver 5 in response to the signal of the real-time clock 14. Then, the display driver 5 wakes up the microcontroller 3 by powering it utilizing the battery 10 and utilizing its power management functionality. If the voltage level of the battery 10 is too high for the microcontroller 3, then the display driver 5 may include a voltage converter configured to down convert the battery voltage to a level suitable for the microcontroller 3. The voltage converter may be integrated into the single integrated circuit that forms the display driver 5.

Upon receiving electric power, the microcontroller 3 retrieves display information stored in the memory 4 and sends the retrieved display information to the display driver 5. The display driver 5 then writes the display information to the display 6 for displaying. Furthermore, after having sent the display information to the display driver 5, the microcontroller 3 sends a signal to the display driver 5 to turn off the power supply for the microcontroller 3. After having written the display information to the display 6, the display driver 5 shuts off automatically. Furthermore, after having displayed the display information for the pre-defined time period, the real-time clock 14 automatically initiates clearing the display 14.

If the chip card 1 is not in contact with the reader 9, then the display 6 can be turned on by activating the button 12 and the chip card 1 can be powered by the battery 10. For the exemplary embodiment, the button interface 13 activates the power management unit 11 to wake up the display driver 5 in response to an activated button 12. Then, the display driver 5 wakes up the microcontroller 3 by powering it utilizing the battery 10 and utilizing its power management functionality. If the voltage level of the battery 10 is too high for the microcontroller 3, then the display driver 5 may include a voltage converter configured to down convert the battery voltage to a level suitable for the microcontroller 3. The voltage converter may be integrated into the single integrated circuit that forms the display driver 5.

Upon receiving electric power, the microcontroller 3 retrieves display information stored in the memory 4 and sends the retrieved display information to the display driver 5. The display driver 5 then writes the display information to the display 6 for displaying. Furthermore, after having sent the display information to the display driver 5, the microcontroller 3 sends a signal to the display driver 5 to turn off the power supply for the microcontroller 3. After having written the display information to the display 6, the display driver 5 shuts off automatically.

Figure 2:
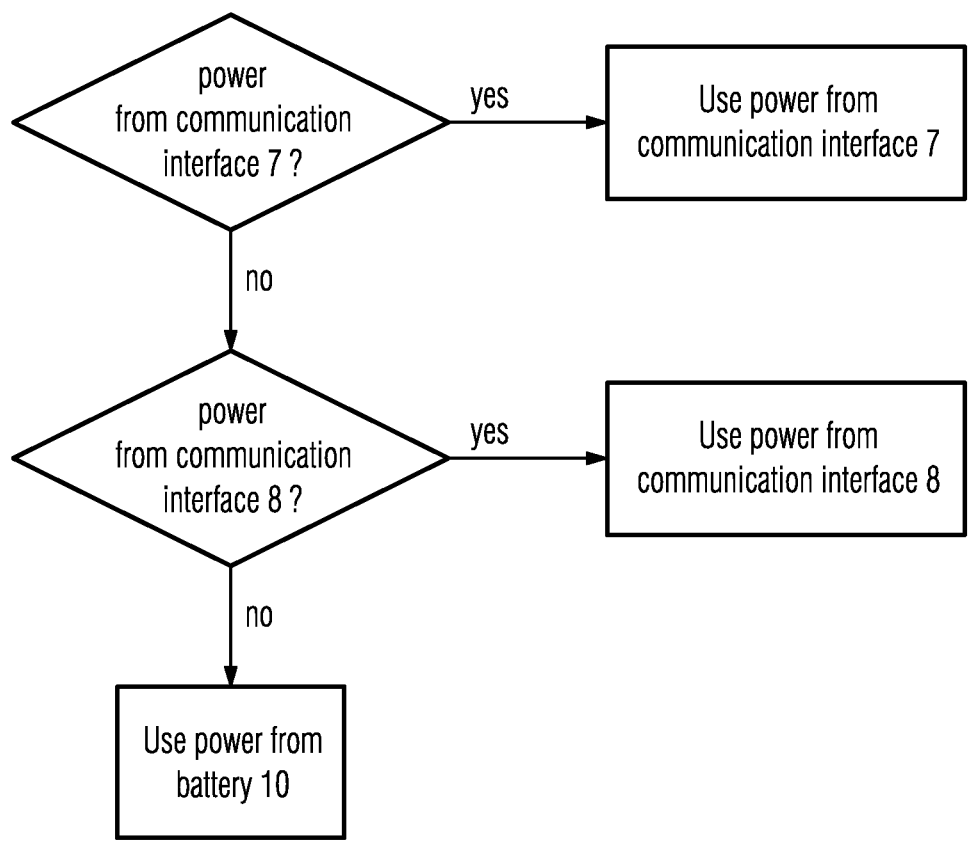
FIG. 2 is a flow chart illustrating a power strategy of the chip card.

For the exemplary embodiment, the power management unit 11 carries out, after being activated, the following power priority strategy if more than one power source is available for the chip card 1. The power strategy is summarized in FIG. 2.

If more than one power source is available, then the power management unit 11 selects the strongest power source. Should power be available via the contact communication interface 7, then the power management unit 11 always selects this power source such that the chip card 1, i.e. its microcontroller 3 and the display driver 5 are powered via the contact communication interface 7.

If no power is available via the contact communication interface 7, then the power management unit 11 checks if power for the microcontroller 3 and the display driver 5 is available via the contactless communication interface 8. If this is the case, then the power management unit 11 selects the contactless communication interface 8 to power the chip card 1.

If power is neither available via the contactless communication interface 8 nor via the contact communication interface 8, then the power management unit 11 selects the battery 10 to power the chip card 1.

Figure 3:
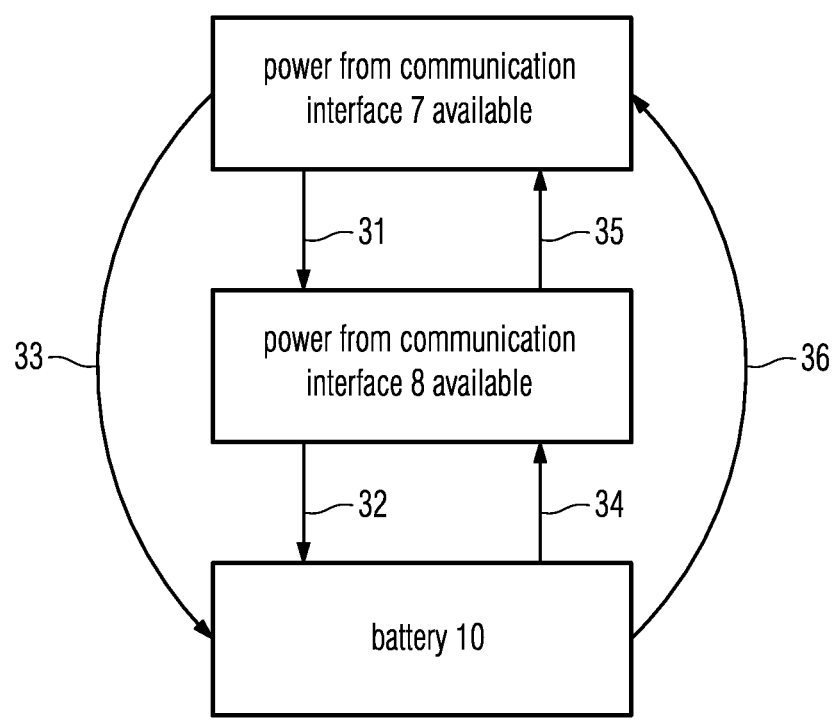
FIG. 3 is a flow chart illustrating a power takeover strategy of the chip card.

During operation of the chip card 1 it may happen that the power source currently used is lost or that a stronger power source than currently used becomes available. For the exemplary embodiment, the power management unit 11 further implements the following power takeover strategy which is summarized in FIG. 3:

A) Assuming, the chip card 1 is initially powered via the contact communication interface 7 and power is lost via the contact communication interface 7, but power is available via the contactless communication interface 8. If information to be displayed on the display 6 has been completely received from the reader 9, then this information is displayed utilizing the display 6 and the display driver 5 is powered via the contactless interface 8, otherwise the chip card 1 is shut off. This is indicated by an arrow 31 in FIG. 3.

B) Assuming, the chip card 1 is initially powered via the contactless communication interface 8 and power is lost via the contactless communication interface 8. If information to be displayed on the display 6 has been completely received from the reader 9, then this information is displayed utilizing the display 6 and the display driver 5 is powered by the battery 10, otherwise the chip card 1 is shut off. This is indicated by an arrow 32 in FIG. 3.

C) Assuming, the chip card 1 is initially powered via the contact communication interface 7, power is lost via the contact communication interface 7, and no power is available via the contactless communication interface 8. If information to be displayed on the display 6 has been completely received from the reader 9, then this information is displayed utilizing the display 6 and the display driver 5 is powered by the battery 10, otherwise the chip card 1 is shut off. This is indicated by an arrow 33 in FIG. 3.

D) Assuming, the chip card 1 is currently powered by the battery 10. If power becomes available via the contactless communication interface 8, then the power management unit 11 selects that the chip card 1 is powered via the contactless communication interface 8. This is indicated by an arrow 34 in FIG. 3.

E) Assuming, the chip card 1 is currently powered via the contactless communication interface 8 and power becomes available via the contact communication interface 7. Then, the reader 9 will reset the microcontroller 3 via the contact communication interface 7 and the chip card 1 will be powered by the contact communication interface 7. This is indicated by an arrow 35 in FIG. 3.

F) Assuming, the chip card 1 is currently powered by the battery 10. If power becomes available via the contact communication interface 7, then the power management unit 11 selects that the chip card 1 is powered via the contact communication interface 7. This is indicated by an arrow 36 in FIG. 3.

For the exemplary embodiment, the power management functionality of the display driver 5 is configured to shut off the microcontroller 3 when not needed while still activating the display driver 5. This is useful, because updating the display 6 by the display driver 5 may take a relatively long time and support by the microcontroller 3 is not needed during this time.

The chip card 1 described above comprises the two communication interfaces 7, 8. This is not absolutely necessary. The chip card 1 can also comprise only one of the communication interfaces. Furthermore, the chip card 1 does not necessarily need the battery 10. Additionally, the button 12 and the button interface 13, generally an input device with associated input interface are optional.

Instead of the real-time clock 14 the chip card 1 can comprise a timer which is an integral part of the driver display 5 by being integrated into the single integrated circuit forming the display driver 5. This timer may particularly be configured to generate and send a signal after a pre-defined period of time after having been activated. This signal may be used to trigger a desired action of the chip card 1, such as clearing the display 6.

Finally, it should be noted that the aforementioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A chip card comprising:
a chip card controller;
access to at least one electric power source;
a display; and
a display driver operatively coupled to the chip card controller, to the display, and to the at least one power source; the display driver being configured to drive the display and comprising, as an integral part, a power management functionality configured to manage electric power that is available from the at least one power source for at least the display driver,
wherein the power management functionality is configured to turn off power for the chip card controller while the display displays display information.

2. The chip card of claim 1, wherein the power management functionality is configured to also manage electric power for the chip card controller.

3. The chip card of claim 1, comprising access to at least two different power sources, wherein the power management functionality is configured to select one of the power sources in accordance with availability of the power sources.

4. The chip card of claim 1, wherein the at least one power source is at least one of
a contact communication interface of the chip card configured to allow communication of the chip card controller with a contact reader;
a contactless communication interface of the chip card configured to allow communication of the chip card controller with a contactless reader;
a battery of the chip card;
a capacitor of the chip card; or
a solar cell of the chip card.

5. The chip card of claim 4, wherein the power management functionality of the display driver is configured
to select, if the chip card is activated, only the battery as the power source for the chip card if no power is available via the communication interface; and
to switch from the battery as the power source for the chip card to the communication interface as the power source for the chip card if power becomes available via the communication interface.

6. The chip card of claim 4, wherein the power management functionality of the display driver is configured
to select the contact communication interface as the preferred power source for the chip card.

7. The chip card of claim 1, wherein the display driver is formed as a single integrated circuit including the power management functionality but excluding the chip card controller.

8. The chip card of claim 1, further comprising a user input device, particularly a button, and a user input interface, particularly a button interface, operatively coupled to the user input device; the user input device being configured to turn on and/or turn off at least parts of the chip card and being an integral part of the display driver.

9. The chip card of claim 1, further comprising a timing device, particularly a clock, a real-time clock, or a timer, as an integral part of the display driver.

* * * * *